United States Patent
Day et al.

(10) Patent No.: US 8,864,120 B2
(45) Date of Patent: Oct. 21, 2014

(54) ELECTROMAGNETIC CLAMPING SYSTEM FOR MANUFACTURING LARGE STRUCTURES

(75) Inventors: Arthur C. Day, Seattle, WA (US); Samuel Roderick Dobbs, Issaquah, WA (US); Branko Sarh, Huntington Beach, CA (US); John Walter Hall, Covington, WA (US); Kyle Paul Larson, Seattle, WA (US)

(73) Assignee: The Boeing Company, Chicago, IL (US)

(*) Notice: Subject to any disclaimer, the term of this patent is extended or adjusted under 35 U.S.C. 154(b) by 606 days.

(21) Appl. No.: 12/773,209

(22) Filed: May 4, 2010

(65) Prior Publication Data

US 2011/0018182 A1    Jan. 27, 2011

Related U.S. Application Data

(60) Provisional application No. 61/228,265, filed on Jul. 24, 2009.

(51) Int. Cl.
- *B25B 11/00* (2006.01)
- *B23Q 3/00* (2006.01)
- *B23Q 3/154* (2006.01)

(52) U.S. Cl.
CPC ............ *B23Q 3/1543* (2013.01); *B25B 11/002* (2013.01)
USPC .......................................... 269/8; 269/289 R

(58) Field of Classification Search
USPC ................. 269/8, 289 R, 903; 335/289–294
See application file for complete search history.

(56) References Cited

U.S. PATENT DOCUMENTS

| | | | | |
|---|---|---|---|---|
| 675,323 A | * | 5/1901 | Clark | 335/290 |
| 1,548,793 A | * | 8/1925 | Bing | 335/289 |
| 1,673,719 A | * | 6/1928 | Tracy | 335/289 |
| 1,970,922 A | * | 8/1934 | Simmons | 335/289 |
| 2,421,716 A | | 6/1947 | Rose | |
| 2,561,769 A | * | 7/1951 | Anderson | 335/289 |
| 2,729,344 A | * | 1/1956 | Birchall | 414/796.2 |
| 2,823,340 A | | 2/1958 | Pierce | |
| 3,209,891 A | | 10/1965 | Littwin | |
| 3,491,995 A | | 1/1970 | Taraba | |

(Continued)

FOREIGN PATENT DOCUMENTS

| | | |
|---|---|---|
| EP | 0585494 A1 | 9/1994 |
| EP | 1022089 A | 7/2000 |

(Continued)

OTHER PUBLICATIONS

GB Examination Report for application GB1011723.2 dated Nov. 8, 2010.

(Continued)

*Primary Examiner* — Elizabeth A Plummer
(74) *Attorney, Agent, or Firm* — Yee & Associates, P.C.

(57) ABSTRACT

An apparatus comprises a housing, a core located in the housing, a coil unit associated with the core and located in the housing, and a backing plate made of a high-permeability material. The apparatus may be used for generating high clamping forces between materials that are interposed between the core and the backing plate such that manufacturing operations can be carried out. The core has a cross section with an elongate shape. The coil unit is configured to generate magnetic fields and has the elongate shape.

19 Claims, 10 Drawing Sheets

(56) References Cited

U.S. PATENT DOCUMENTS

| | | | |
|---|---|---|---|
| 3,553,612 A * | 1/1971 | Zimmer | 335/128 |
| 4,227,162 A * | 10/1980 | Fujita et al. | 335/202 |
| 5,047,742 A * | 9/1991 | Hsu | 335/289 |
| 5,145,227 A | 9/1992 | Monford | |
| 5,971,379 A | 10/1999 | Leon | |
| 5,998,889 A * | 12/1999 | Novak | 310/12.29 |
| 6,221,297 B1 * | 4/2001 | Lanoue et al. | 264/219 |
| 6,229,422 B1 * | 5/2001 | Pignataro | 335/289 |
| 6,357,101 B1 | 3/2002 | Sarh et al. | |
| 6,371,274 B1 | 4/2002 | Ditter et al. | |
| 6,536,100 B2 | 3/2003 | Sarh et al. | |
| 6,644,637 B1 * | 11/2003 | Shen et al. | 269/152 |
| 6,652,252 B2 * | 11/2003 | Zabar | 417/417 |
| 6,670,807 B2 | 12/2003 | Cox | |
| 6,762,516 B2 * | 7/2004 | Maruyama | 310/12.04 |
| 6,837,160 B2 * | 1/2005 | Leppanen et al. | 101/415.1 |
| 6,875,964 B2 * | 4/2005 | Golovashchenko et al. | 219/603 |
| 6,905,291 B2 | 6/2005 | Day et al. | |
| 6,917,131 B2 | 7/2005 | Cheung et al. | |
| 7,023,312 B1 * | 4/2006 | Lanoue et al. | 336/60 |
| 7,088,210 B2 | 8/2006 | Day et al. | |
| 7,148,776 B2 | 12/2006 | Day et al. | |
| 7,162,789 B2 | 1/2007 | Day et al. | |
| 7,269,894 B2 | 9/2007 | Day et al. | |
| 7,647,692 B2 * | 1/2010 | Lanoue et al. | 29/609 |
| 7,793,900 B2 * | 9/2010 | Feng et al. | 248/206.5 |
| 7,843,296 B2 | 11/2010 | Fullerton et al. | |
| 7,999,645 B2 * | 8/2011 | Sarda | 335/289 |
| 7,999,919 B2 | 8/2011 | Miyajima et al. | |
| 8,031,038 B2 * | 10/2011 | Kimura | 335/285 |
| 8,106,735 B2 * | 1/2012 | Li | 335/294 |
| 8,111,123 B2 * | 2/2012 | Lim et al. | 336/55 |
| 8,628,529 B2 | 1/2014 | Aldridge et al. | |
| 2002/0050043 A1 | 5/2002 | Sarh et al. | |
| 2002/0190826 A1 * | 12/2002 | Molteni | 335/291 |
| 2003/0132746 A1 | 7/2003 | Cox | |
| 2004/0016097 A1 | 1/2004 | Bloch et al. | |
| 2004/0061585 A1 | 4/2004 | Dunning et al. | |
| 2004/0088843 A1 * | 5/2004 | Day et al. | 29/34 B |
| 2005/0092817 A1 * | 5/2005 | Baumann et al. | 228/212 |
| 2005/0093666 A1 | 5/2005 | Miyajima et al. | |
| 2005/0153818 A1 | 7/2005 | Hazlehurst et al. | |
| 2005/0237146 A1 * | 10/2005 | Hirzel | 336/212 |
| 2006/0214756 A1 | 9/2006 | Elliot et al. | |
| 2007/0034757 A1 | 2/2007 | Heard | |
| 2008/0155807 A1 | 7/2008 | Toh et al. | |
| 2009/0039989 A1 * | 2/2009 | Reuber | 335/127 |
| 2009/0283946 A1 | 11/2009 | Cai et al. | |
| 2010/0071192 A1 * | 3/2010 | Sarh et al. | 29/525.06 |
| 2012/0062866 A1 * | 3/2012 | Binnard et al. | 355/72 |
| 2014/0111033 A1 | 4/2014 | Yang | |

FOREIGN PATENT DOCUMENTS

| | | |
|---|---|---|
| EP | 1132164 A | 9/2001 |
| FR | 2722437 A | 1/1996 |
| GB | 336105 A | 12/1928 |
| GB | 2002072 A | 2/1979 |
| GB | 2256749 A | 12/1991 |
| WO | 9626038 A1 | 8/1996 |

OTHER PUBLICATIONS

Office Action, dated Aug. 17, 2012, regarding U.S. Appl. No. 12/263,766, 16 pages.

Notice of Allowance, dated Mar. 6, 2013, regarding U.S. Appl. No. 12/263,766, 12 pages.

Office Action, dated Feb. 13, 2014, regarding U.S. Appl. No. 13/920,087, 19 pages.

Notice of Allowance, dated May 15, 2014, regarding U.S. Appl. No. 13/920,087, 21 pages.

* cited by examiner

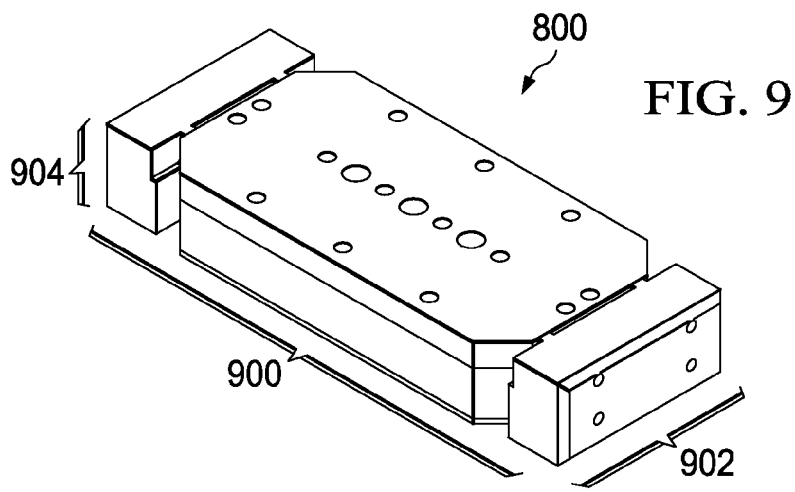
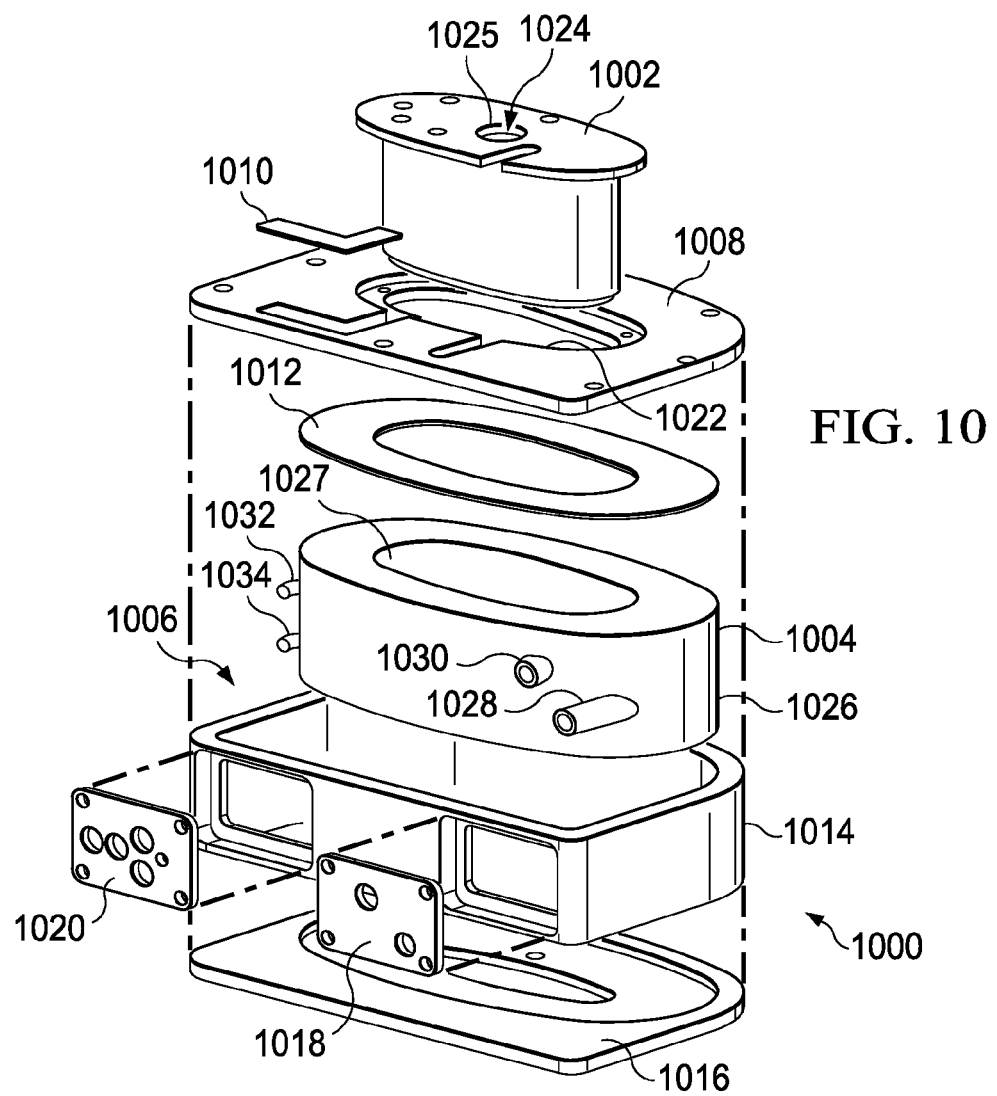

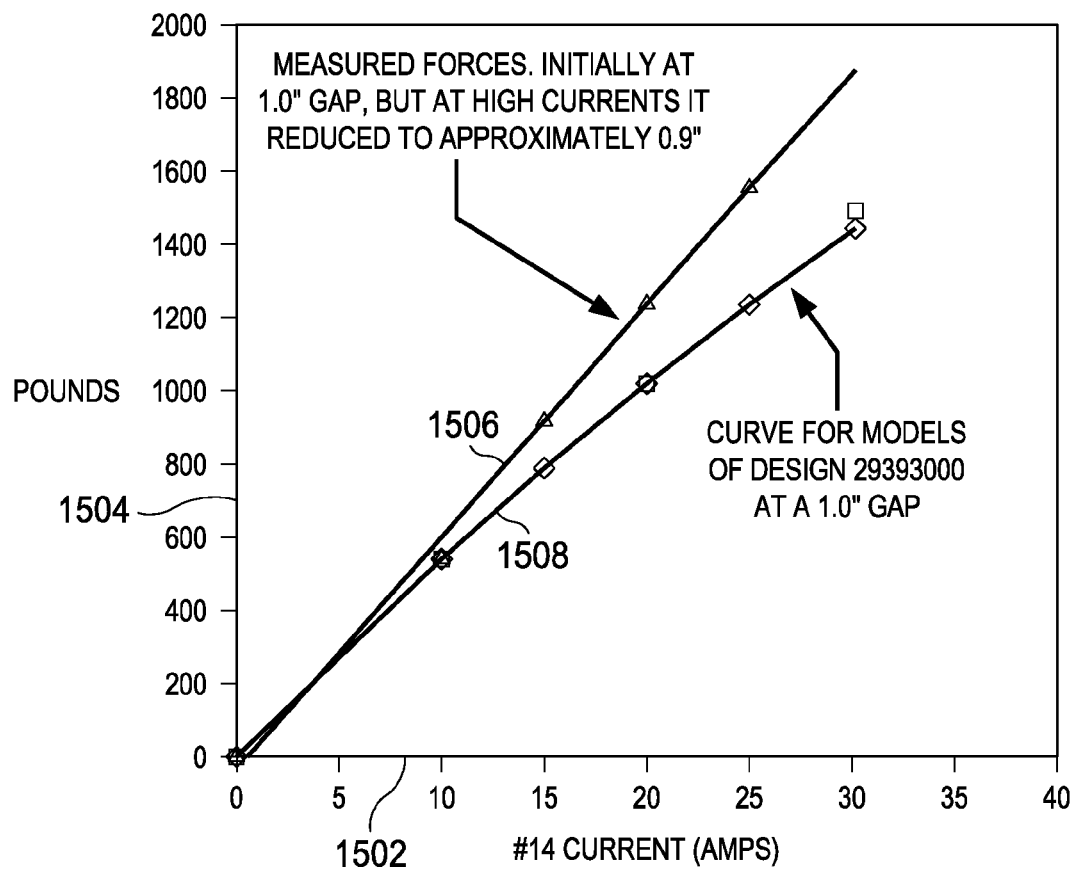

ELECTROMAGNETIC CLAMPING SYSTEM FOR MANUFACTURING LARGE STRUCTURES

BACKGROUND INFORMATION

1. Field

The present disclosure relates generally to manufacturing and, in particular, to a method and apparatus for processing a workpiece. Still more particularly, the present disclosure relates to a method and apparatus for clamping a workpiece to perform operations on the workpiece.

2. Background

In assembling structures such as those for an aircraft, rivets and/or other types of fasteners may be installed to attach parts to each other. These types of fasteners may be installed into airframe structures. The airframe structures include, for example, without limitation, wing and fuselage skins, supporting structures, and/or other suitable structures.

It is desirable to perform the drilling of holes and insertion of fasteners using a one-up assembly process. A one-up assembly process involves assembling the layers for the workpiece at one time. These layers are parts that are to be fastened to each other without having to take the layers apart during the assembly process. For example, a skin panel may be fastened to a spar or spar cap. These parts make up the layers in the workpiece. In another example, a skin panel may be attached to a frame of a fuselage. These parts also form a workpiece.

After the parts have been put together to form a workpiece, operations may be performed on the workpiece. For example, the workpiece is drilled, inspected, and fastened without the removal of layers from each other for other operations, such as deburring, cleaning, sealing, and other suitable operations.

With currently used systems, the drilling forces may cause inconsistencies in the workpiece, gaps between layers in the workpiece, and burrs that may be undesirable. As a result, one common process to assemble these types of aircraft structures involves placing the components in a clamping device, such as a jig. Parts, such as skin panels, spars, and/or ribs, are loaded into a jig to form the layers in the workpiece. Holes are then drilled through the parts. Thereafter, the parts are disassembled for other operations, such as deburring and cleanup. The parts are reassembled with sealants and/or fasteners.

This type of process uses equipment and floor space. Further, the process of drilling holes, disassembling the parts, and then reassembling the parts increases the time needed to assemble a wing as compared to using a one-up process. As a result, currently used processes may have increased time and/or expense that may be undesirable with respect to manufacturing aircraft or other large structures.

Thus, it would be advantageous to have a method and apparatus that takes into account at least one of the issues discussed above, as well as possibly other issues.

SUMMARY

In one advantageous embodiment, an apparatus comprises a housing, a core located in the housing, and a coil unit associated with the core and located in the housing. The core has a cross section with an elongate shape. The coil unit is configured to generate magnetic fields and has the elongate shape.

In another advantageous embodiment, a clamping apparatus comprises a housing, a core located in the housing, a shell associated with the housing, and coils located inside the shell. The core has a cross section with an elongate shape. The coils are configured to generate magnetic fields. The shell and the coils have the elongate shape.

In yet another advantageous embodiment, a method is present for performing a number of operations on a workpiece. A backing plate is positioned on a first surface of the workpiece. The backing plate has an elongate shape. An electromagnetic clamping device is positioned on a second surface of the workpiece. The first surface is opposite the second surface. The electromagnetic clamping device comprises a housing, a core located in the housing, and coils associated with the core. The core has an elongate cross section, and the coils are configured to generate magnetic fields. The electromagnetic clamping device is activated such that a number of forces caused by a number of electromagnetic fields clamps the workpiece between the electromagnetic clamping device and the backing plate. The number of operations is performed on the workpiece.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 9 is an illustration of an electromagnetic clamping device in accordance with an advantageous embodiment;

FIG. 10 is an illustration of an electromagnetic clamping device in accordance with an advantageous embodiment;

FIG. 15 is an illustration of forces for an electromagnetic clamping system in accordance with an advantageous embodiment.

DETAILED DESCRIPTION

Figure 1:
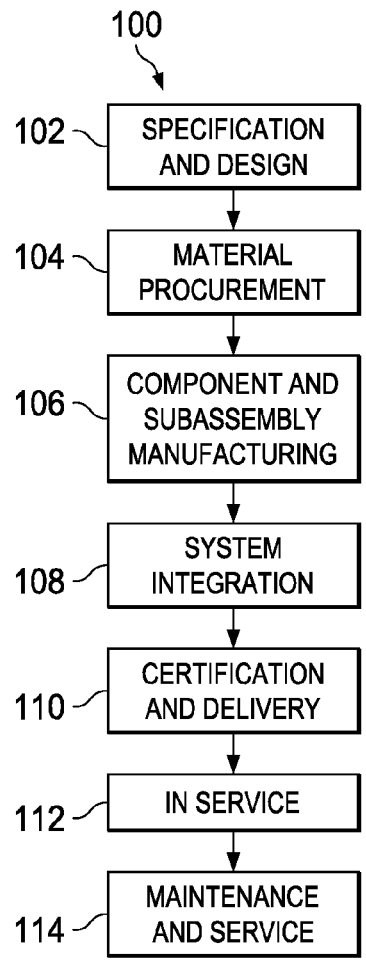
FIG. 1 is an illustration of an aircraft manufacturing and service method in accordance with an advantageous embodiment.
Figure 2:
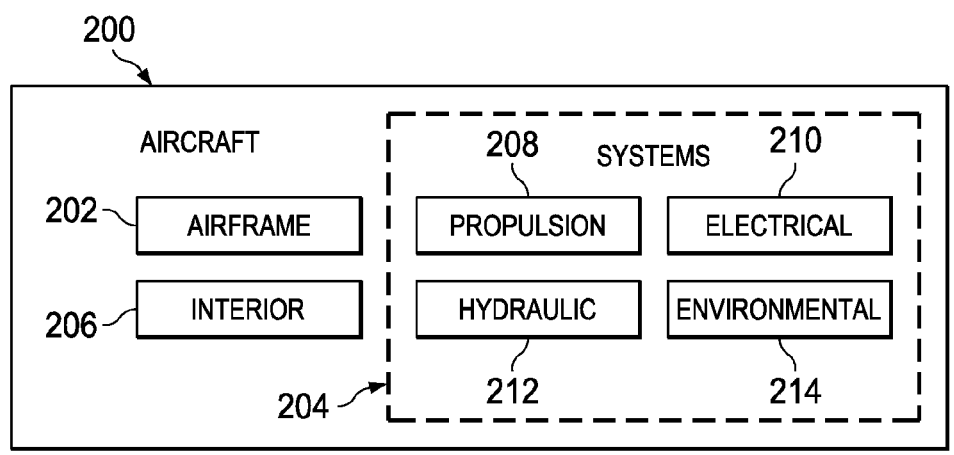
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

The different advantageous embodiments recognize and take into account a number of different considerations. For example, one or more of the different advantageous embodiments recognize and take into account that some processes or mechanisms that may be used to hold parts together in a workpiece may not be practical for aircraft structures, such as wings.

For example, C-frame clamps may be used to pull parts together for a wing. These types of clamps, however, may not be practical for operations performed on the wing. For example, these C-frame clamps may not be practical when attaching a skin panel to a substructure in the wing in which the wing is nearly closed out and the only access to the interior is through the fuel access doors in the lower wing panel.

The length and geometry of the path may make it difficult for a C-frame clamp to provide a desired amount of clamping force needed to pull the skin panel against substructures, such as spars and ribs. The amount of force that may be required is about 1,000 pounds or more. This force may be needed to obtain a desired quality for a hole that is drilled through the workpiece containing these parts.

Additionally, pushing on the skin panel from the outside of the wing is not generally acceptable. This type of force may cause inconsistencies in the structure.

One or more of the different advantageous embodiments may pull the different parts towards each other with a force that may be about equal and substantially opposite to each other. This type of force may reduce a distortion in the shape of the workpiece that may cause inconsistencies or undesired tolerances.

The different advantageous embodiments also recognize and take into account that other systems may be unable to provide the sufficient pull-up force against the internal structure of a wing. For example, the flex track system is capable of holding and transporting drilling equipment on a wing skin. This type of system, however, may not be able to provide sufficient pull-up force against a spar and a wing without additional operations. For example, pre-drilled holes through the skin and spar may be needed for a secondary attachment. The different advantageous embodiments recognize and take into account that without sufficient force, gaps may be present and burrs may be formed. As a result, a desired one-up assembly may not be performed with this type of device and process.

The different advantageous embodiments also recognize and take into account that magnetic devices may be used to assemble some structures, such as fuselage splices. These types of devices may involve a magnetic clamp in which the parts in the layers of a workpiece are located between an electromagnetic clamping device and a steel backing plate.

The different advantageous embodiments recognize and take into account that the current designs for electromagnetic clamping devices may not be able to create the desired level of force for structures, such as wings. For example, currently used electromagnetic clamping devices have a circular core with coils around the circular core. This type of design may provide for forces of about 300 to about 500 pounds for a workpiece that is about one half inch thick.

As a workpiece becomes thicker, the electromagnetic clamping device and the steel backing plate are farther apart, which results in less magnetic attraction. Further, the different layers in the workpiece may have a stiffness that requires larger amounts of force to close gaps.

Also, with larger structures, the fasteners and drills may be larger as compared to smaller structures. As a result, drilling forces also may be greater. Larger structures may include aircraft structures such as, for example, a wing, a vertical stabilizer, a horizontal stabilizer, and other structures of similar and larger sizes. With these types of structures, a force of about 1,000 pounds or more may be needed to drill through a workpiece that has layers stacked up with a thickness of greater than about one inch.

The different advantageous embodiments also recognize and take into account that the current circular architecture for electromagnetic clamping devices may be difficult to use with the architecture of aircraft structures, such as the structures found in a wing. For example, without limitation, an elongate footprint is desirable as compared to a circular footprint. In these illustrative examples, the footprint is the area on the surface of a structure in these examples.

For example, a spar cap may have a surface that is about 1.5 inches to about 2 inches wide with a length that may be, for example, about 50 feet to about 100 feet long. Using an electromagnetic clamp over the entire length of a spar may be impractical because of the weight and power requirements for such a large electromagnet.

The different advantageous embodiments recognize and take into account that in most wing drilling and assembly operations, fastener holes are drilled, sealed, and filled with fasteners sequentially so that clamping pressures are only useful near the hole currently being processed. Thus, one or more of the different advantageous embodiments provide a desired amount of force for clamping a workpiece near the hole. This type of force may maximize the clamp force over a section of a spar cap only, comprising about one foot to about two feet in length.

As can be seen, this footprint of the spar cap may require a backing plate that does not extend over the edge of the spar cap, such that the backing plate tips off the edge when used with an electromagnetic clamping device.

The different advantageous embodiments recognize that scaling up the size of the components in an electromagnetic clamping system may lead to an undesired increase in weight. Further, the thickness of the magnets also increases with scaling. The thickness may be such that passing a drill motor or a fastener insertion tool through a center bore of a magnet becomes difficult or impractical.

Thus, the different advantageous embodiments provide a method and apparatus for clamping workpieces and/or performing assembly operations. The clamping of the workpiece may be such that the assembly operations are performed in a one-up manner. In one advantageous embodiment, an apparatus comprises a housing, a core, and a coil unit. The core has an elongate cross section located within the housing. The coil unit is associated with the housing and is configured to generate magnetic fields.

A first component may considered to be associated with a second component by being secured to the second component, bonded to the second component, fastened to the second component, and/or connected to the second component in some other suitable manner. The first component also may be connected to the second component through using a third component. The first component also may be considered to be associated with the second component by being formed as part of and/or an extension of the second component.

In some advantageous embodiments, the core unit may comprise a shell with a coil located within the shell. The shell may have a channel through which the core may be received.

Figure 3:
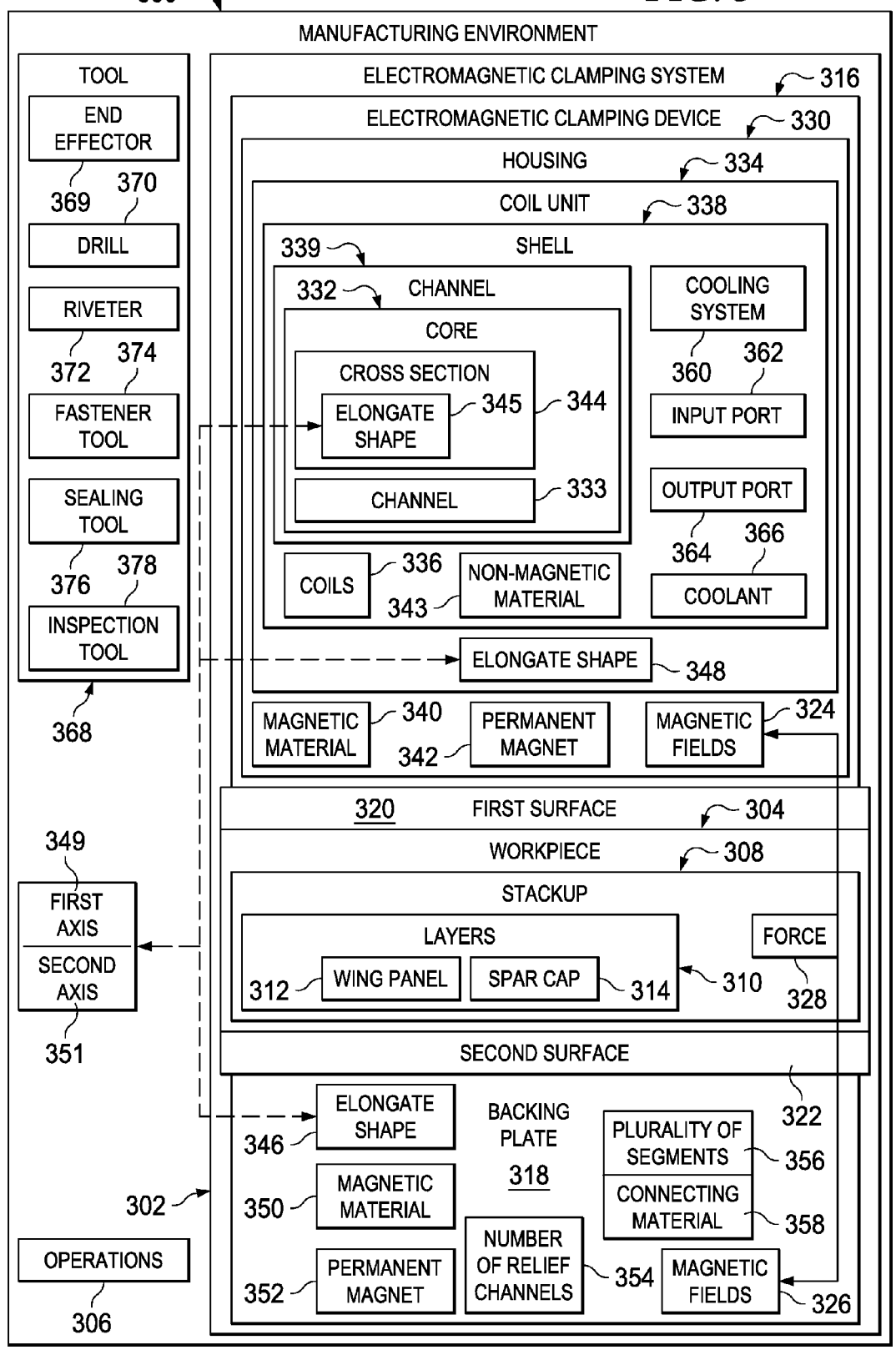
FIG. 3 is an illustration of a manufacturing environment in accordance with an advantageous embodiment.

Turing now to FIG. 3, an illustration of a manufacturing environment is depicted in accordance with an advantageous embodiment. In this illustrative example, manufacturing environment 300 is an example of a manufacturing environment that may be used to manufacture structures for aircraft 200 in FIG. 2.

In this illustrative example, manufacturing environment 300 includes electromagnetic clamping system 302. Electromagnetic clamping system 302 holds workpiece 304 for the performance of operations 306 on workpiece 304.

Workpiece 304, in this example, takes the form of stackup 308. Stackup 308 has layers 310, which are clamped together by electromagnetic clamping system 302. Layers 310 may be parts for a structure, such as those found in aircraft 200 in FIG. 2. For example, without limitation, layers 310 may include wing panel 312 and spar cap 314. Of course, other numbers of layers and types of parts or layers may be present in workpiece 304.

In this depicted example, electromagnetic clamping system 302 includes electromagnetic clamping device 316 and backing plate 318. Electromagnetic clamping device 316 is positioned on first surface 320 of workpiece 304, while backing plate 318 is positioned on second surface 322 of workpiece 304.

First surface 320 is substantially opposite of second surface 322. In other words, these two surfaces have planes that are substantially parallel to each other in these examples. Of course, in some advantageous embodiments, these surfaces may not be substantially parallel, depending on the particular implementation.

When electromagnetic clamping device 316 is activated, electromagnetic clamping device 316 generates magnetic fields 324. Backing plate 318 is attracted to electromagnetic clamping device 316 by magnetic fields 324. Depending on the implementation of backing plate 318, backing plate 318 also may generate magnetic fields 326. This interaction causes electromagnetic clamping device 316 to be pulled towards first surface 320 and backing plate 318 to be pulled towards second surface 322 of workpiece 304.

Magnetic fields 324 and/or magnetic fields 326 generate force 328 in these illustrative examples. Force 328 clamps electromagnetic clamping device 316 to backing plate 318 with workpiece 304 located between electromagnetic clamping device 316 and backing plate 318. The level of force 328 may vary, depending on magnetic fields 324 generated by electromagnetic clamping device 316.

In this illustrative example, electromagnetic clamping device 316 includes housing 330, core 332, and coil unit 334. Core 332 is associated with housing 330. Core 332 also has channel 333. In this illustrative example, coil unit 334 is located around core 332. Coil unit 334 includes coils 336. Coil unit 334 also may include shell 338. In these illustrative examples, shell 338 is a structure that encompasses or contains coils 336. In these illustrative examples, shell 338 has channel 339. Channel 339 is configured to receive core 332.

In these illustrative examples, shell 338 is removably attached to at least one of housing 330 and core 332. With the use of shell 338, coils 336 may be more easily removed from electromagnetic clamping device 316. Shell 338 may be removed to replace coils 336 or to test or perform maintenance on coils 336.

Housing 330 may be made of various materials. For example, without limitation, housing 330 may be comprised of a magnetic material. A magnetic material, in these illustrative examples, is a material that may be magnetized when magnetic fields 324 are generated. Housing 330 may be made from a combination of magnetic material 340 and permanent magnet 342.

In the depicted examples, core 332 may be made from any material that provides a desired amount of magnetic permeability and flex density. Core 332 may be comprised of at least one of iron, steel, a carbon steel, a silicon steel, Permendur, an iron-cobalt-vanadium magnetic alloy, a carbon-magnetic iron alloy, or some other suitable type of material.

In these illustrative examples, shell 338 may be made of non-magnetic material 343. In these illustrative examples, shell 338 also may be comprised of a number of other types of materials. For example, without limitation, shell 338 may be comprised of a conducting material or a non-conducting material. For example, without limitation, shell 338 may be made of a composite material, a plastic, fiberglass, or some other suitable material. In yet other advantageous embodiments, a metallic material may be used. For example, shell 338 may be comprised of stainless steel, aluminum, and/or other suitable materials.

In these illustrative examples, core 332 has cross section 344 that has elongate shape 345. Elongate shape 345 for cross section 344 is in contrast to currently used cores, which have a circular cross section. With elongate shape 345 for cross section 344, coil unit 334 has elongate shape 348.

In these illustrative examples, the dimensions and geometries for core 332, coil unit 334, and/or coils 336 may vary, depending on the particular implementation. For example, the dimensions may be selected to achieve a desired amount of force that may be generated by electromagnetic clamping device 316 and backing plate 318 for workpiece 304. The identification of force 328 that may be generated by electromagnetic clamping device 316 and backing plate 318 may be made by taking the square of the average magnetic flux density over core 332 by the area of overlap of elongate shape 348 for backing plate 318.

In these examples, the magnetic flux density is dependent on the magnetomotive force of coils 336 within coil unit 334. This flux density may be generally identified as the number of wire loops or turns multiplied by the current in amperes. Further, the magnetic flux density also depends on the magnetic reluctance of electromagnetic clamping system 302 with electromagnetic clamping device 316 and backing plate 318.

As depicted in these illustrative examples, elongate shape 345 and elongate shape 348 may be, for example, without limitation, an ellipse, a rectangle, an oval, or some other suitable shape. In these illustrative examples, an elongate shape or cross section may be any shape that has first axis 349 and second axis 351 in which first axis 349 and second axis 351 are perpendicular to each other. Further, first axis 349 is longer than second axis 351.

In these illustrative examples, backing plate 318 has elongate shape 346. Elongate shape 346 may correspond in shape to elongate shape 348 for coil unit 334. In other words, elongate shape 346 may have different dimensions from elongate shape 345 and/or elongate shape 348. Further, elongate shape 345 and elongate shape 348 also may have dimensions that are different from each other. The dimensions may be proportional to each other in some advantageous embodiments.

In these depicted examples, elongate shape 345 and elongate shape 348 provide for increased coupling of magnetic fields 324 into magnetic fields 326. As a result, force 328 may be increased as compared to currently used clamping devices.

In these illustrative examples, backing plate 318 may be comprised of a number of different types of materials. For example, without limitation, backing plate 318 may be comprised of magnetic material 350. Additionally, in some advantageous embodiments, backing plate 318 also may include permanent magnet 352.

In some advantageous embodiments, backing plate 318 may include number of relief channels 354. In these illustrative examples, number of relief channels 354 allows tool 368 to pass through backing plate 318 during the performance of operations 306. Number of relief channels 354 also may allow fasteners or other features on the surface of workpiece 304 to fit around or through backing plate 318.

In some advantageous embodiments, backing plate 318 may be a single piece or may be formed from plurality of segments 356. Plurality of segments 356 may be connected to each other by connecting material 358. Connecting material 358 may allow for plurality of segments 356 to be moveable with respect to each other. In these illustrative examples, connecting material 358 may have a selected gauge, specific thickness, or selected stiffness that allows for a desired amount of moveability between plurality of segments 356. This moveability of plurality of segments 356 may provide a capability for backing plate 318 to conform to second surface 322 if second surface 322 is not flat or planar.

In these illustrative examples, shell 338 also may function as cooling system 360. With this type of implementation, cooling system 360 provides the capability to cool electromagnetic clamping device 316 during operations 306.

In this example, shell 338 may be sealed and have input port 362 and output port 364. Input port 362 receives coolant 366, which may be circulated or flow within shell 338. Coolant 366 flows out of shell 338 through output port 364.

Coolant 366 may be, for example, without limitation, air, water, a water and glycol mixture, and/or some other suitable type of coolant. Depending on the particular design of shell 338, multiple types of coolants may be used.

In these illustrative examples, operations 306 may be part of a one-up assembly process. In other words, operations 306 may be performed such that layers 310 in stackup 308 of workpiece 304 do not need to be separated to connect layers 310 to each other.

In these illustrative examples, tool 368 may take various forms for use in performing operations 306. For example, without limitation, tool 368 may be end effector 369, drill 370, riveter 372, fastener tool 374, sealing tool 376, or inspection tool 378.

The illustration of manufacturing environment 300 is not meant to imply physical or architectural limitations to a manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, a number of additional backing plates in addition to backing plate 318 may be employed. In other advantageous embodiments, electromagnetic clamping system 302 may have a number of coils in addition to coils 336 that may be located around additional cores in addition to core 332.

In yet other advantageous embodiments, core 332 may have a number of channels in addition to channel 333. In still other advantageous embodiments, cooling system 360 may be omitted. For example, shell 338 may contain coils 336 but may not include input port 362 and output port 364 for coolant. In yet other advantageous embodiments, coils 336 may be attached to at least one of housing 330 and core 332 without using shell 338. As yet another example, number of relief channels 354 and channel 333 may allow other tools to pass through in addition to or in place of tool 368.

Figure 4:
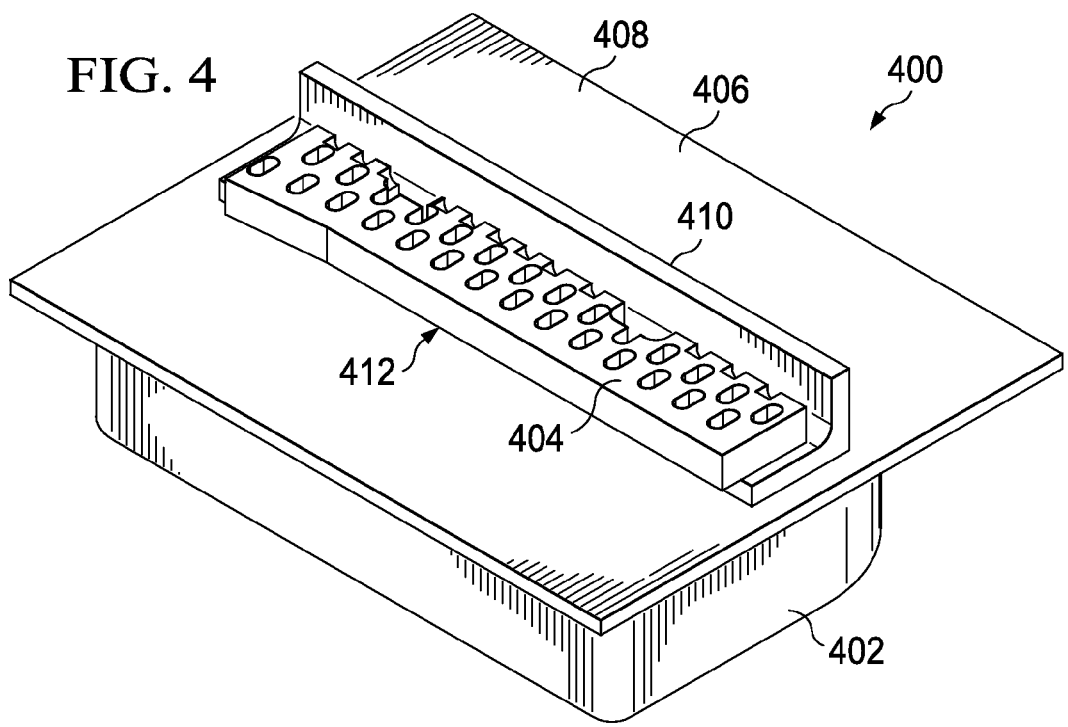
FIG. 4 is an illustration of an electromagnetic clamping system in accordance with an advantageous embodiment.

With reference now to FIG. 4, an illustration of an electromagnetic clamping system is depicted in accordance with an advantageous embodiment. In this example, electromagnetic clamping system 400 is an example of one implementation for electromagnetic clamping system 302 in FIG. 3.

As illustrated, electromagnetic clamping system 400 includes electromagnetic clamping device 402 and backing plate 404. Electromagnetic clamping device 402 is an example of one implementation for electromagnetic clamping device 316 in FIG. 3. Backing plate 404 is an example of one implementation for backing plate 318 in FIG. 3. In this illustrative example, electromagnetic clamping system 400 clamps workpiece 406. Workpiece 406, in this example, includes skin panel 408 and spar cap 410. In this illustrative example, backing plate 404 has number of relief channels 412. Number of relief channels 412 allow for tools, such as end effectors, to pass through during performance of operations on workpiece 406.

As can be seen in this example, backing plate 404 has an elongate shape. This elongate shape is one that allows for increased force to be applied to workpiece 406. The increased force may occur because substantially all of backing plate 404 can be placed onto spar cap 410 in this illustrative example.

Figure 5:
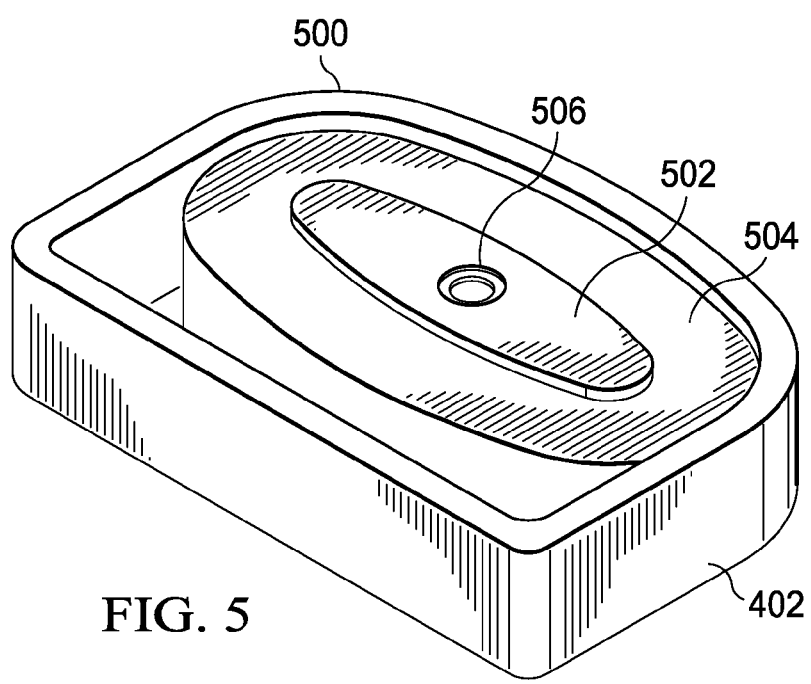
FIG. 5 is an illustration of an electromagnetic clamping device in accordance with an advantageous embodiment.

Turning now to FIG. 5, an illustration of an electromagnetic clamping device is depicted in accordance with an advantageous embodiment. In this example, additional features of electromagnetic clamping device 402 are illustrated.

As can be seen in this figure, electromagnetic clamping device 402 comprises housing 500, core 502, and coil unit 504. In this illustrative example, core 502 is located within housing 500. Core 502 may be associated with housing 500, depending on the particular implementation. Coil unit 504 is located around core 502.

Additionally, core 502 has channel 506. Channel 506 extends through core 502 and housing 500. Channel 506 may allow for other tools, such as end effectors, to pass through electromagnetic clamping device 402 to perform operations on a workpiece, such as workpiece 406 in FIG. 4.

In this illustrative example, core 502 has an elongate cross section. Additionally, coil unit 504 also has an elongate shape. The elongate shape of coil unit 504 allows for magnetic fields to be directed towards backing plate 404 in FIG. 4 in a manner that increases the force that may be applied to workpiece 406 in FIG. 4.

Figure 6:
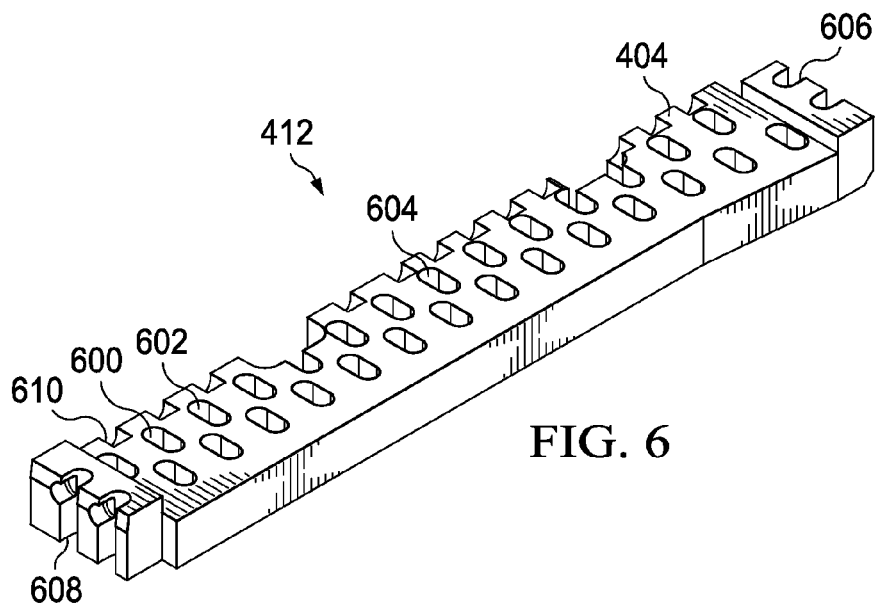
FIG. 6 is an illustration of a backing plate in accordance with an advantageous embodiment.

Turning now to FIG. 6, an illustration of a backing plate is depicted in accordance with an advantageous embodiment. In this example, additional details of backing plate 404 can be seen in this view.

As depicted, backing plate 404 includes number of relief channels 412. These relief channels include, for example, without limitation, holes such as holes 600, 602, and 604. Additionally, number of relief channels 412 also may include grooves such as, for example, without limitation, grooves 606, 608, and 610.

In this illustrative example, holes, such as holes 600, 602, and 604, allow for holes to be drilled through a workpiece. Further, grooves, such as groves 606, 608, and 610, may allow for the clearance of fasteners that may have already been installed or other features that may be present.

Of course, the illustration of backing plate 404 is not meant to imply physical or architectural limitations to the manner in which different features may be implemented. For example, in some advantageous embodiments, backing plate 404 may not include holes, such as holes 600, 602, and 604. Instead, a drill may create a new hole within backing plate 404. With this type of implementation, backing plate 404 may require fewer customized tools. After a number of uses, backing plate 404 may be replaced with a new backing plate.

Figure 7:
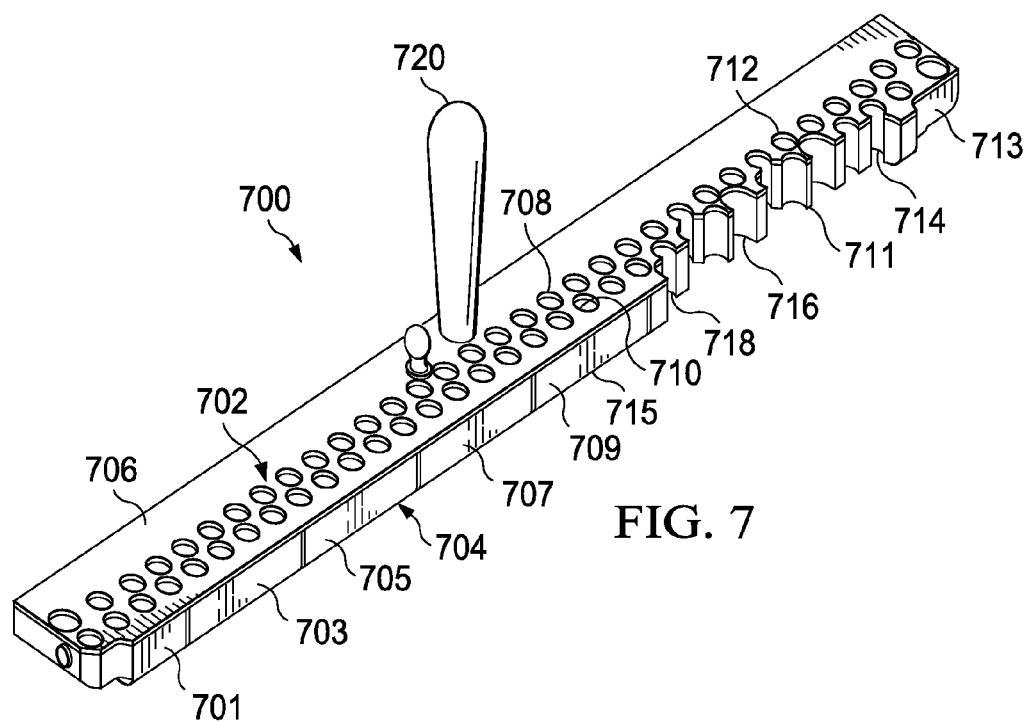
FIG. 7 is an illustration of a backing plate in accordance with an advantageous embodiment.

With reference now to FIG. 7, an illustration of a backing plate is depicted in accordance with an advantageous embodiment. In this illustrative example, backing plate 700 is an example of one implementation for backing plate 318 in FIG. 3. Backing plate 700 has number of relief channels 702, plurality of segments 704, and connecting material 706. In this example, plurality of segments 704 includes segments 701, 703, 705, 707, 709, 711, and 713.

In this illustrative example, plurality of segments 704 is connected by connecting material 706. Connecting material 706 is an annealed steel spring plate in this example. Connecting material 706 allows plurality of segments 704 to be moveable with respect to each other. For example, when surface 715 of plurality of segments 704 is on a surface that is not substantially flat or planar, connecting material 706 may bend in a number of locations to move plurality of segments 704 with respect to each other. The movement of plurality of segments 704 with respect to each other may, in turn, allow backing plate 700 to conform to the surface.

As depicted in this illustrative example, number of relief channels 702 has holes, such as holes 708, 710, and 712. Number of relief channels 702 also has grooves, such as grooves 714, 716, and 718. Further, in this illustrative example, backing plate 700 has handle 720. Handle 720 may be used for installing and removing backing plate 700 onto and from a surface for a workpiece.

Figure 8:
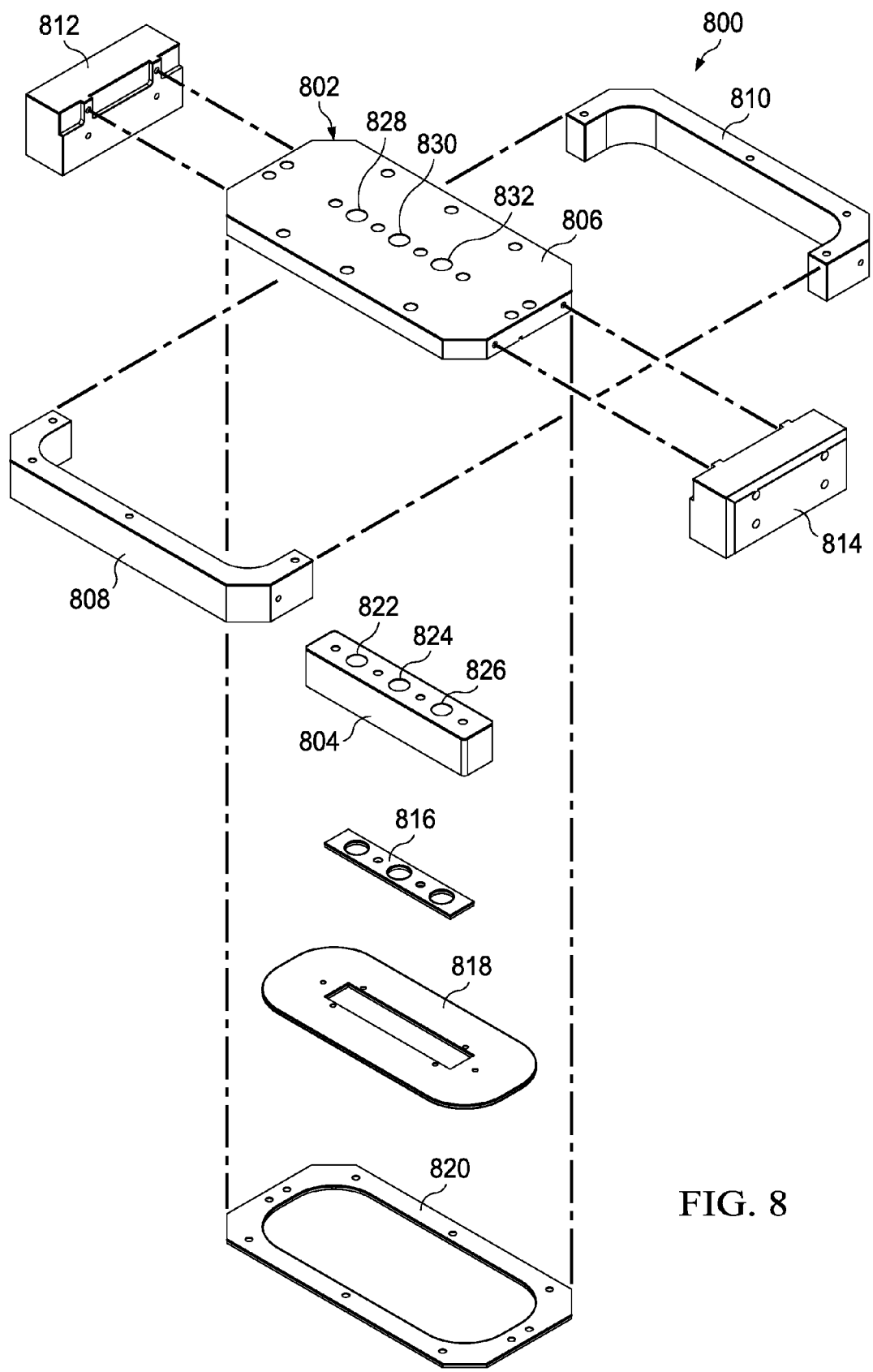
FIG. 8 is an illustration of an exploded view of a portion of an electromagnetic clamping device in accordance with an advantageous embodiment.

With reference now to FIG. 8, an illustration of an exploded view of a portion of an electromagnetic clamping device is depicted in accordance with an advantageous embodiment. In this illustrative example, electromagnetic clamping device 800 is an illustration of a portion of electromagnetic clamping device 316 in FIG. 3.

In this exploded view, electromagnetic clamping device 800 includes housing 802 and core 804. Coils for electromagnetic clamping device 800 are not shown in this example to avoid obscuring the illustration of housing 802 and core 804. In these illustrative examples, the different components shown for housing 802 and core 804 may be made from materials, such as steel. Of course, other materials may be used, depending on the particular implementation.

In this illustrative example, core 804 may be associated with planar member 806. Side member 808 and side member 810 may be attached to planar member 806. Mounting structures 812 and 814 also may be attached to planar member 806, and these mounting structures also may be attached to side members 808 and 810. Side member 808, side member 810, mounting structure 812, and mounting structure 814 form sides for housing 802. Nosepiece 816 may be attached to core 804. Nosepiece 816 concentrates the force of electromagnetic clamping device 800 over a selected area where a hole is to be drilled or other operations are carried out. However, including a nosepiece increases the effective gap between the electromagnet and the backing plate and may reduce the attractive force. As a result, nosepiece 816 should be as thin as possible. A thickness of about 0.05 to about 0.10 inches is presented as an example.

Plates 818 and 820 may be used to retain a coil placed around core 804. Plates 818 and 820 form a side of housing 802 opposite to the side formed by planar member 806.

In these illustrative examples, core 804 has an elongate shape and may provide forces in excess of about 1,000 pounds when a coil is placed into housing 802 of electromagnetic clamping device 800.

In this depicted example, core 804 has channels 822, 824, and 826. These channels may correspond to holes 828, 830, and 832 in planar member 806. The holes and channels allow a tool or end effector to pass through electromagnetic clamping device 800 during the performance of operations on a workpiece.

Turning now to FIG. 9, an illustration of an electromagnetic clamping device is depicted in accordance with an advantageous embodiment. In this illustrative example, electromagnetic clamping device 800 is shown in an assembled or unexploded view. In this illustrative example, electromagnetic clamping device 800 has length 900, width 902, and height 904. Length 900 may be about 18 inches, width 902 may be about eight inches, and height 904 may be about three inches. Of course, any dimension may be used, depending on the particular implementation.

Turning now to FIG. 10, an illustration of an electromagnetic clamping device is depicted in accordance with an advantageous embodiment. In this depicted example, electromagnetic clamping device 1000 is illustrated in an exploded view.

As illustrated, electromagnetic clamping device 1000 includes core 1002, coil unit 1004, and housing 1006. In this illustrative example, housing 1006 includes cover 1008, cover access panel 1010, compression gasket 1012, case 1014, cover 1016, access panel 1018, and access panel 1020.

Core 1002 may be placed through hole 1022 in cover 1008. Core 1002 also has channel 1024 which may allow for tools or end effectors to pass through to perform operations on a workpiece. In this illustrative example, channel 1024 is defined by nosepiece 1025 in core 1002. Nosepiece 1025 concentrates the force of electromagnetic clamping device 1000 over a selected area.

Coil unit 1004 comprises shell 1026 with coils (not shown) located within shell 1026. Shell 1026 provides a structure to hold the coils. In this manner, the coils may be more easily removable from electromagnetic clamping device 1000. This configuration for shell 1026 is in contrast to other designs in which coils are wrapped directly around core 1002.

Shell 1026, in this illustrative example, may be connected to at least one of cover 1008, case 1014, and cover 1016. Shell 1026 also has channel 1027. Channel 1027 is configured to receive core 1002.

Additionally, shell 1026 also includes input port 1028 and output port 1030. Shell 1026 may form part of a cooling system for the coils (not shown) within coil unit 1004. Further, shell 1026 has connectors 1032 and 1034. These connectors allow for electrical connections to be made to coils within shell 1026.

Figure 11:
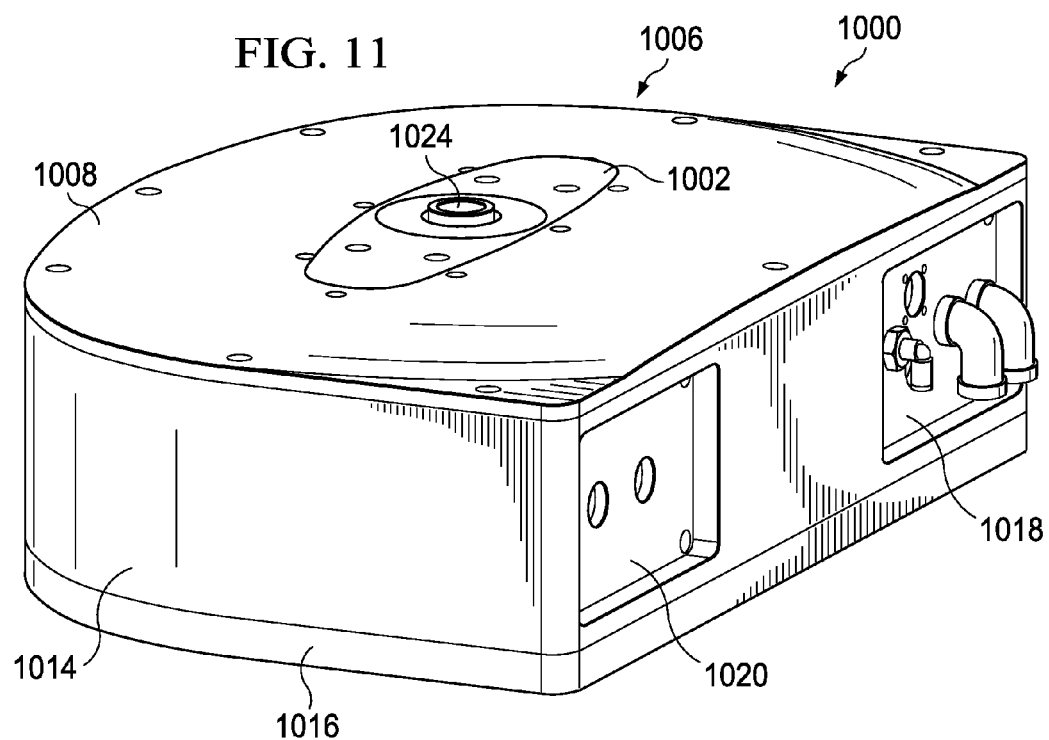
FIG. 11 is an illustration of an assembled electromagnetic clamping device in accordance with an advantageous embodiment.

Turning now to FIG. 11, an illustration of an assembled electromagnetic clamping device is depicted in accordance with an advantageous embodiment. In this illustrative example, electromagnetic clamping device 1000 is shown in an assembled view.

Figure 12:
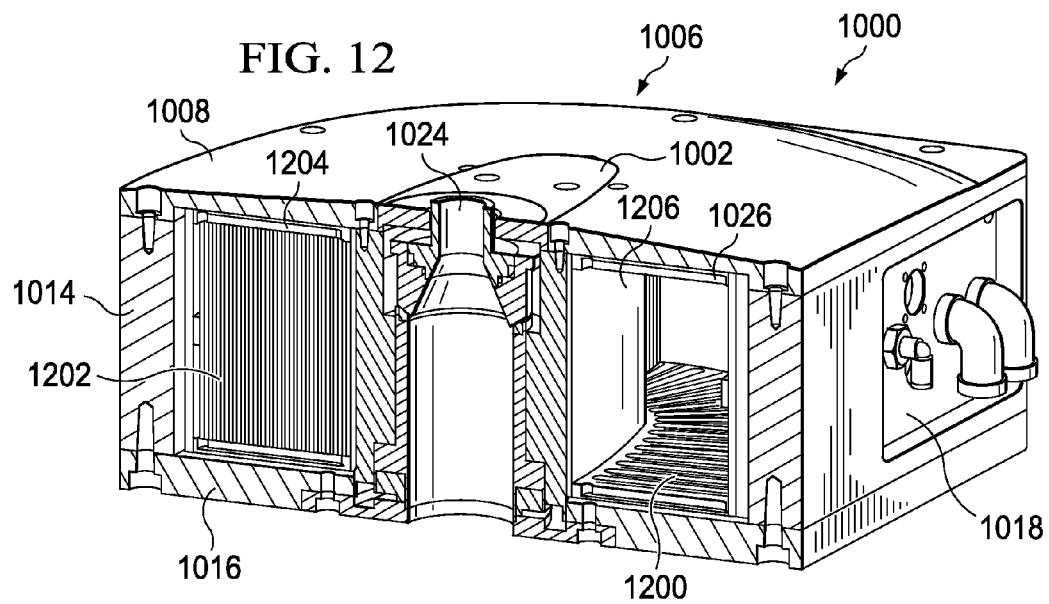
FIG. 12 is an illustration of a cross-sectional view of an electromagnetic clamping device in accordance with an advantageous embodiment.

With reference next to FIG. 12, an illustration of a cross-sectional view of an electromagnetic clamping device is depicted in accordance with an advantageous embodiment. In this view, electromagnetic clamping device 1000 is shown in a cross-sectional view. In this view, interior 1200 of shell 1026 is depicted. Coils 1202 can be seen in section 1204, while coils 1202 are not present in section 1206 of interior 1200 of shell 1026. Also depicted in this illustrative example are channels on the inner surface of the upper and lower plates within shell 1026.

Figure 13:
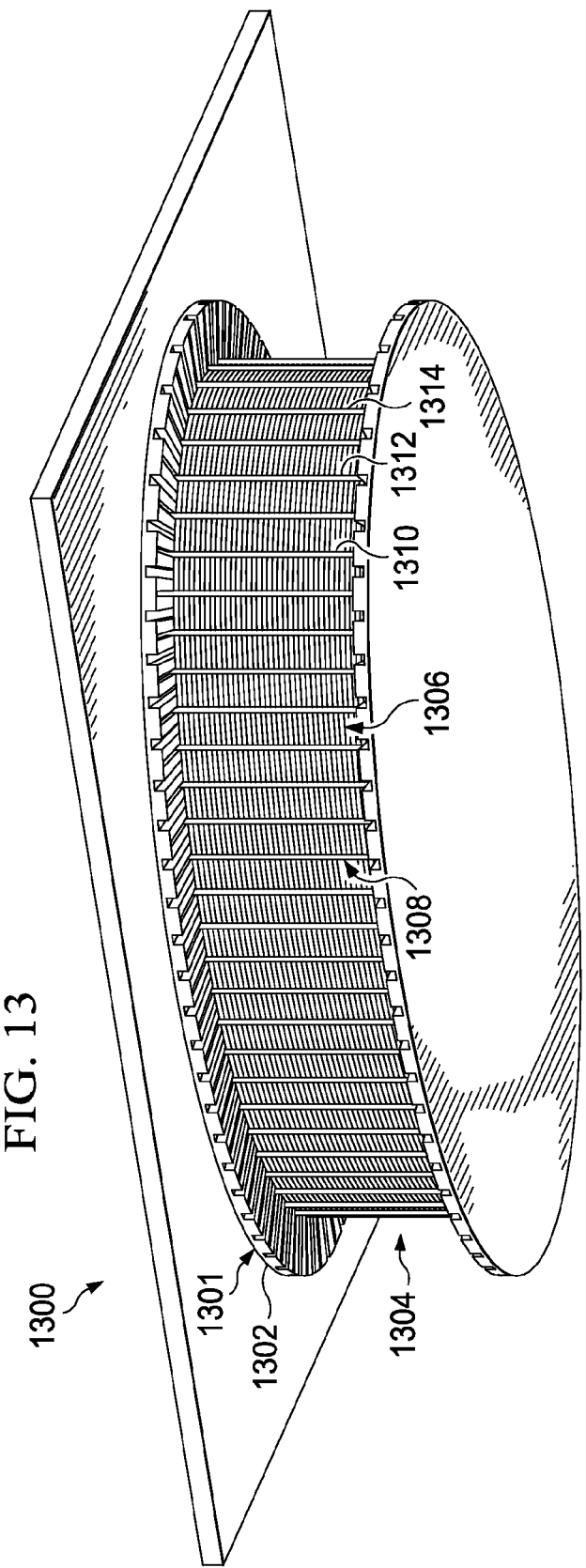
FIG. 13 is an illustration of an exposed view of an electromagnetic clamping device in accordance with an advantageous embodiment.

With reference now to FIG. 13, an illustration of an exposed view of an electromagnetic clamping device is depicted in accordance with an advantageous embodiment. In this illustrative example, electromagnetic clamping device 1300 is an example of one implementation for electromagnetic clamping device 316 in FIG. 3. As depicted, electromagnetic clamping device 1300 includes coil unit 1301. In this example, coil unit 1301 has shell 1302 with interior 1304. As depicted, interior 1304 includes coils 1306 and spacer elements 1308.

In this illustrative example, spacer elements 1308 take the form of rods such as, for example, rods 1310, 1312, and 1314. In other advantageous embodiments, spacer elements may take the form of, for example, without limitation, bars, a perforated lattice, or other shapes separating groupings of windings within coils 1306.

Spacer elements 1308 may be made of a number of different types of materials. In these illustrative examples, spacer elements 1308 may be comprised of a non-conductive material. This non-conductive material may reduce abrasion and shorting within coils 1306. Spacer elements 1308 may be comprised of, for example, without limitation, polytetrafluoroethylene, polyoxymetylene, fiberglass, alumina, and/or other suitable materials.

Figure 14:
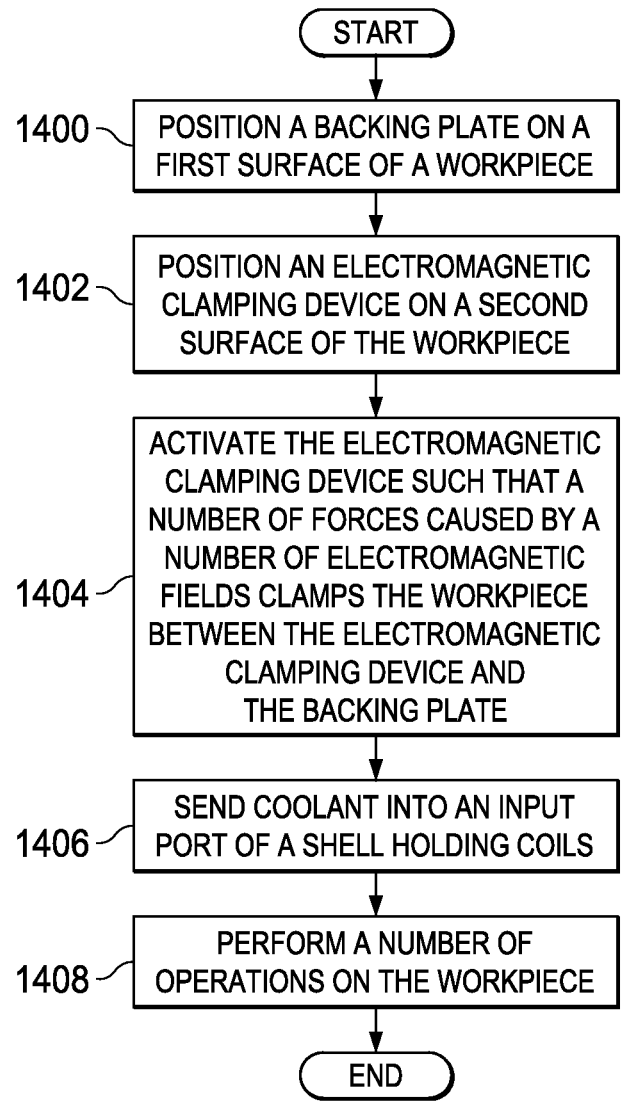
FIG. 14 is an illustration of a flowchart of a process for performing a number of operations on a workpiece in accordance with an advantageous embodiment.

Turning now to FIG. 14, an illustration of a flowchart of a process for performing a number of operations on a workpiece is depicted in accordance with an advantageous embodiment. The process illustrated in FIG. 14 is an example of operations that may be performed using manufacturing environment 300 in FIG. 3.

The process begins by positioning a backing plate on a first surface of the workpiece (operation 1400). The backing plate has an elongate shape in these examples. The process also positions an electromagnetic clamping device on a second surface of the workpiece (operation 1402). The first surface is opposite the second surface. This electromagnetic clamping device is an electromagnetic clamping device, such as electromagnetic clamping device 316 in FIG. 3.

The process then activates the electromagnetic clamping device such that a number of forces caused by a number of electromagnetic fields clamps the workpiece between the electromagnetic clamping device and the backing plate (operation 1404).

The process also sends coolant into an input port of a shell holding coils (operation 1406). The process then performs a number of operations on the workpiece (operation 1408), with the process terminating thereafter.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in the flowchart or block diagrams.

Turning now to FIG. 15, an illustration of forces for an electromagnetic clamping system is depicted in accordance with an advantageous embodiment. In this example, graph 1500 illustrates current on horizontal axis 1502 and force in pounds on vertical axis 1504. Line 1506 illustrates forces that were measured for a device with a gap of between about 0.9 and about 1.0 inches. Line 1508 illustrates forces for a gap of about 1.0 inch that were predicted with a finite-element analysis code for magnetic fields and forces. As can be seen, these forces provide forces of about 1,000 or more pounds, which are greater than the forces of about 500 pounds generated by currently used electromagnetic devices.

With one or more of the different advantageous embodiments, the footprint of the electromagnetic clamping system is more similar to the footprint of the structures. In other words, instead of a circular footprint, an elongated footprint is provided using one or more of the different advantageous embodiments. In this manner, greater forces may be applied to the structures having elongated surfaces or shapes as compared to currently used circular electromagnetic clamping devices.

For example, operation 1406 may be performed prior to operation 1404 or at the same time operation 1404 is performed. In yet other illustrative examples, operation 1402 may be performed before or at the same time as operation 1400.

Thus, the different advantageous embodiments provide a method and apparatus for performing operations on a workpiece. One or more of the different advantageous embodiments may be used to perform one of the assembly processes on workpieces that may be for structures, such as a wing of an aircraft, a horizontal stabilizer, a vertical stabilizer, a fuselage, or some other suitable type of structure. The different advantageous embodiments may take the form of an apparatus comprising a housing, a core, and a coil unit. The core has an elongate cross section located in the housing. The coil unit is associated with the core and is configured to generate magnetic fields.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an electromagnetic clamping device comprising:
a housing;
a core located in the housing, wherein the core has a cross section with an elongate shape, wherein the cross section is substantially parallel to a footprint of the apparatus; and
a coil unit configured to receive the core and located in the housing, wherein the coil unit is configured to generate magnetic fields and the coil unit has the elongate shape, and wherein the coil unit comprises a shell and coils located within the shell such that the coils are not wrapped directly around the core.

2. The apparatus of claim 1, wherein the elongate shape is selected from one of a shape with substantially straight sides, a shape with curved sides, and a shape configured to match a foot print of a part.

3. The apparatus of claim 1, wherein the electromagnetic clamping device further comprises a backing plate including a plurality of relief channels, wherein the relief channels include at least one of holes and grooves, wherein the backing plate is positioned on a second surface of the workpiece and wherein the second surface is opposite the first surface.

4. The apparatus of claim 3, wherein
the backing plate has the elongate shape.

5. The apparatus of claim 4, wherein the backing plate is formed from a plurality of segments connected to each other by connecting material of at least one of a selected gauge, specific thickness, and selected stiffness and wherein the backing plate is configured to allow a desired amount of movability between the plurality of segments.

6. The apparatus of claim 5, wherein the plurality of relief channels at least one of allows a tool to pass through the backing plate and allows fasteners on a surface of a workpiece to fit one of around and through the backing plate.

7. The apparatus of claim 3, wherein the backing plate is comprised of a number of materials selected from at least one of a magnetic material and a permanent magnet.

8. The apparatus of claim 1, wherein the coil unit comprises:
a cooling system.

9. The apparatus of claim 8, wherein the cooling system comprises:
the shell configured to hold the coils and to receive a coolant;
an input port in the shell; and
an output port in the shell.

10. The apparatus of claim 8 further comprising:
a number of channels configured for coolant to flow through the coils.

11. The apparatus of claim 1, wherein the elongate shape is selected from one of an ellipse, a rectangle, and an oval.

12. A clamping apparatus comprising:
an electromagnetic clamping device comprising:
a housing;
a core located in the housing, wherein the core has a cross section with an elongate shape, wherein the cross section is substantially parallel to a footprint of the apparatus;
a shell attached to the housing, the shell configured to receive the core; and
coils located inside the shell such that the coils are not wrapped directly around the core, wherein the coils are configured to generate magnetic fields, and wherein the shell and the coils have the elongate shape.

13. The clamping apparatus of claim 12 further comprising:
an input port; and
an output port, wherein the input port is configured to receive a coolant and the output port is configured to output the coolant.

14. A method for performing a number of operations on a workpiece, the method comprising:
positioning a backing plate on a first surface of the workpiece, wherein the backing plate has an elongate shape;
positioning an electromagnetic clamping device on a second surface of the workpiece, wherein the first surface is opposite the second surface, and wherein the electromagnetic clamping device comprises a housing; a core having an elongate cross section located in the housing, the elongate cross section substantially parallel to the second surface of the workpiece; and coils inside a shell located around the core such that the coils are not wrapped directly around the core, wherein the coils are configured to generate magnetic fields;

activating the electromagnetic clamping device such that a number of forces caused by a number of electromagnetic fields clamps the workpiece between the electromagnetic clamping device and the backing plate; and performing the number of operations on the workpiece.

15. The method of claim 14 further comprising:

sending coolant in an input port in the shell configured to hold the coils.

16. The method of claim 14, wherein the workpiece comprises a spar and a skin panel.

17. The method of claim 14, wherein the number of operations is selected from at least one of a drilling operation, a fastening operation, a sealing operation, and an inspection operation.

18. The method of claim 14, wherein the number of operations is performed to connect a plurality of layers in the workpiece to each other without disassembling the plurality of layers.

19. The method of claim 14, wherein the workpiece is for a structure selected from one of a wing, a horizontal stabilizer, a vertical stabilizer, a fuselage, and a control surface.

* * * * *